United States Patent
Kwak et al.

(10) Patent No.: US 12,170,785 B2
(45) Date of Patent: Dec. 17, 2024

(54) METHOD AND APPARATUS FOR ADAPTIVE IMAGE PREPROCESSING AND RECONSTRUCTION

(71) Applicant: ELECTRONICS AND TELECOMMUNICATIONS RESEARCH INSTITUTE, Daejeon (KR)

(72) Inventors: Sang-Woon Kwak, Daejeon (KR); Joung-Il Yun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 22 days.

(21) Appl. No.: 17/980,135

(22) Filed: Nov. 3, 2022

(65) Prior Publication Data

US 2023/0164337 A1 May 25, 2023

(30) Foreign Application Priority Data

Nov. 25, 2021 (KR) .......................... 10-2021-0164317
Mar. 31, 2022 (KR) .......................... 10-2022-0040527

(51) Int. Cl.
*H04N 19/42* (2014.01)
*H04N 19/103* (2014.01)
*H04N 19/132* (2014.01)

(52) U.S. Cl.
CPC ........... *H04N 19/42* (2014.11); *H04N 19/103* (2014.11); *H04N 19/132* (2014.11)

(58) Field of Classification Search
CPC .... H04N 19/42; H04N 19/103; H04N 19/132; H04N 19/134; H04N 19/136; H04N 19/154; H04N 19/59
See application file for complete search history.

(56) References Cited

U.S. PATENT DOCUMENTS

| | | |
|---|---|---|
| 11,170,470 B1 | 11/2021 | He et al. |
| 2019/0037238 A1 | 1/2019 | Lee et al. |
| 2020/0014953 A1* | 1/2020 | Mammou .............. H04N 19/17 |
| 2020/0154142 A1 | 5/2020 | Seo et al. |
| 2020/0302265 A1* | 9/2020 | Wang ....................... G06N 3/04 |
| 2020/0304802 A1* | 9/2020 | Habibian ................ G06F 18/21 |

(Continued)

FOREIGN PATENT DOCUMENTS

KR 10-2141302 8/2020

OTHER PUBLICATIONS

Sun et al., "Learned Image Downscaling for Upscaling using Content Adaptive Resampler", IEEE Transactions on Image Processing, Feb. 4, 2020, pp. 1-14.

(Continued)

*Primary Examiner* — Tracy Y. Li
(74) *Attorney, Agent, or Firm* — KILE PARK REED & HOUTTEMAN PLLC

(57) ABSTRACT

Disclosed herein is a method for adaptive image preprocessing and reconstruction. The method includes preprocessing an input image, encoding and decoding the preprocessed image, and reconstructing the encoded and decoded image. Here, preprocessing the input image may be performed using a preprocessing kernel generated based on a control parameter indicating a weight for human vision and machine vision.

10 Claims, 6 Drawing Sheets

(56) References Cited

U.S. PATENT DOCUMENTS

| | | |
|---|---|---|
| 2020/0349392 A1 | 11/2020 | Rohekar |
| 2022/0217371 A1* | 7/2022 | Jiang .................. G06V 10/993 |
| 2022/0318606 A1* | 10/2022 | Kim .................. G06N 3/045 |
| 2023/0066626 A1* | 3/2023 | Kim .................. G06N 3/0464 |
| 2023/0072702 A1* | 3/2023 | Gao .................. G06N 3/0464 |

OTHER PUBLICATIONS

Marin et al., "Efficient Segmentation: Learning Downsampling Near Semantic Boundaries", 2019 IEEE/CVF International Conference on Computer Vision (ICCV), Oct. 27, 2019, pp. 1-11.

\* cited by examiner

METHOD AND APPARATUS FOR ADAPTIVE IMAGE PREPROCESSING AND RECONSTRUCTION

CROSS REFERENCE TO RELATED APPLICATIONS

This application claims the benefit of Korean Patent Application No. 10-2021-0164317, filed Nov. 25, 2021, and No. 10-2022-0040527, filed Mar. 31, 2022, which are hereby incorporated by reference in their entireties into this application.

BACKGROUND OF THE INVENTION

1. Technical Field

The present invention relates to image preprocessing and reconstruction technology that enables selective optimization between perceptual quality and task execution performance in an environment in which images are consumed by both humans and machines.

More particularly, the present invention relates to technology for generating a bitstream and a reconstructed image that are optimized for machine vision or perceptual quality according to need in a single system.

2. Description of the Related Art

Conventional video coding technologies have been developed with a focus on human perceptual quality. Video coding technologies, such as High-Efficiency Video Coding (HEVC) or Versatile Video Coding (VVC), have been developed in order to achieve high compression efficiency and to reduce degradation of subjective image quality perceived by individuals and objective image quality indexes, such as Peak Signal-to-Noise Ratio (PSNR), Structural Similarity Index Measure (SSIM), and the like. However, as entities consuming images have recently changed from humans to machines in various applications, such as autonomous cars, drones, smart surveillance cameras, and the like, video coding technology optimized for task execution performance of machines, rather than human perceptual quality, is required. Accordingly, the Moving Picture Expert Group (MPEG), which is an international standardization group, is actively working on standardization of a new video coding method capable of outperforming anchor on the subject of Video Coding for Machine (VCM).

Even in an application in which major entities consuming images are machines, images for humans are still required. Particularly in the case of an application such as a smart surveillance camera, it is important for the camera to always perform a specific machine vision task well, but people may also consume images according to need (e.g., people see images for themselves or reconstruct high-resolution images from the original images and store the same). Therefore, it may be undesirable to irreversibly transform images with a focus only on task execution performance such that the images cannot be reconstructed. Accordingly, a hybrid vision system for supporting both human vision and machine vision is required in order to improve task execution performance of machines and to enable image reconstruction for humans, and discussion on such a system is actively underway. As one of various requirements for such a hybrid vision system, there is system scalability. That is, it should be possible to dynamically generate a bitstream and a reconstructed image so as to be optimized for a task or image quality according to need in a single system.

DOCUMENTS OF RELATED ART (Patent Document 1) Korean Patent No. 10-2141302, titled "Object detection method based on deep-learning regression model and image processing apparatus".

SUMMARY OF THE INVENTION

An object of the present invention is to provide a hybrid vision system for an environment in which images are consumed by both humans and machines.

Another object of the present invention is to provide a scalable system that can be selectively optimized depending on the task to be performed and requirements.

In order to accomplish the above objects, a method for adaptive image preprocessing and reconstruction according to an embodiment of the present invention includes preprocessing an input image, encoding and decoding the preprocessed image, and reconstructing the encoded and decoded image. Here, preprocessing the input image may comprise using a preprocessing kernel generated based on a control parameter indicating a weight for human vision and machine vision.

Here, reconstructing the encoded and decoded image may be performed using a reconstruction network corresponding to the value of the control parameter.

Here, the preprocessing kernel may be a resampling kernel for performing non-uniform sampling on the input image based on the characteristics of the input image.

Here, the reconstruction network may be trained by giving priority to a loss function for performing a task of the machine vision as the value of the control parameter is larger.

Here, reconstructing the encoded and decoded image may be performed using multiple models respectively trained using a loss function corresponding to the control parameter.

Here, the multiple models may correspond to models trained by varying the loss function depending on the control parameter for the reconstruction network.

Here, the preprocessing kernel may be generated adaptively to the input image using a kernel generator network.

Here, the kernel generator network and the reconstruction network may operate in pair depending on the value of the control parameter.

In order to accomplish the above objects, an apparatus for adaptive image preprocessing and reconstruction according to an embodiment of the present invention includes a preprocessing unit for preprocessing an input image, an encoding unit for encoding the preprocessed image, a decoding unit for decoding the encoded image, and a reconstruction unit for reconstructing the decoded image. Here, the preprocessing unit may use a preprocessing kernel generated based on a control parameter indicating a weight for human vision and machine vision.

Here, the reconstruction unit may perform reconstruction using a reconstruction network corresponding to the value of the control parameter.

Here, the preprocessing kernel may correspond to a resampling kernel for performing non-uniform sampling on the input image based on the characteristics of the input image.

Here, the reconstruction network may be trained by giving priority to a loss function for performing a task of the machine vision as the value of the control parameter is larger.

Here, the reconstruction unit may perform training using multiple models respectively trained using a loss function corresponding to the control parameter.

Here, the multiple models may correspond to models trained by varying the loss function depending on the control parameter for the reconstruction network.

Here, the preprocessing kernel may be generated adaptively to the input image using a kernel generator network.

Here, the kernel generator network and the reconstruction network may operate in pair depending on the value of the control parameter.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Figure 1:
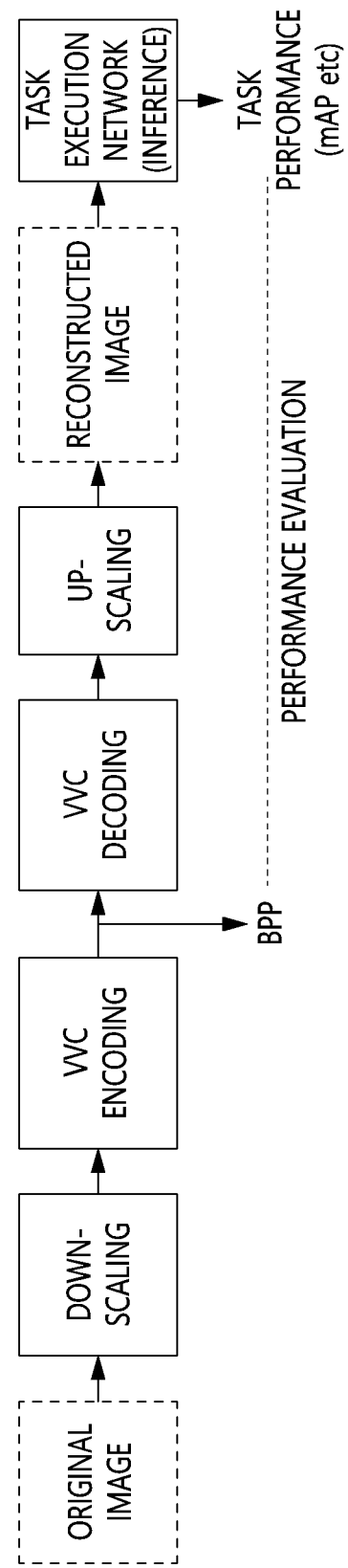
FIG. 1 is a block diagram illustrating an anchor structure of MPEG VCM standardization.

The advantages and features of the present invention and methods of achieving the same will be apparent from the exemplary embodiments to be described below in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only, and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, embodiments of the present invention will be described in detail with reference to the accompanying drawings. In the following description of the present invention, the same reference numerals are used to designate the same or similar elements throughout the drawings, and repeated descriptions of the same components will be omitted.

FIG. 1 is a block diagram illustrating an anchor structure of MPEG VCM standardization.

Referring to FIG. 1, an anchor structure of MPEG VCM standardization includes a downscaling unit for an original image, an encoding unit, a decoding unit, and an upscaling unit. Here, task performance may be evaluated by inputting a reconstructed image to a task execution network.

Figure 2:
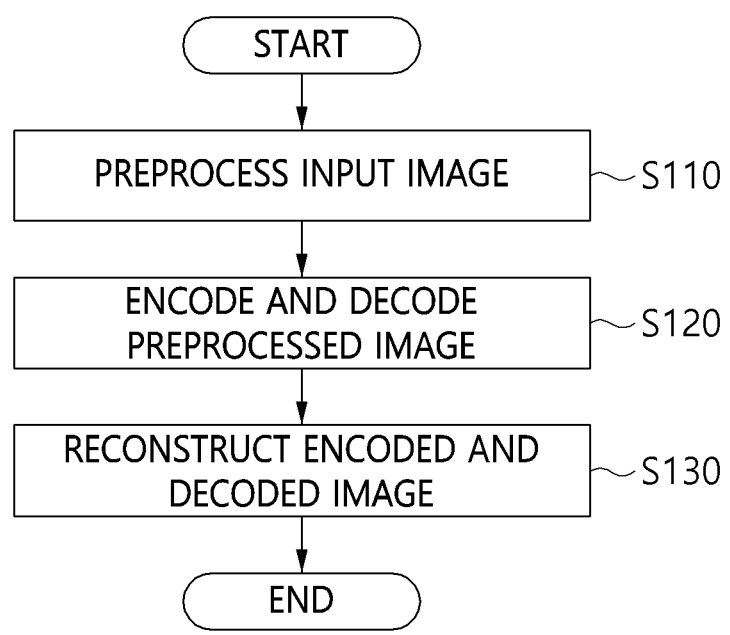
FIG. 2 is a flowchart illustrating a method for adaptive image preprocessing and reconstruction according to an embodiment of the present invention.

FIG. 2 is a flowchart illustrating a method for adaptive image preprocessing and reconstruction according to an embodiment of the present invention.

The method for adaptive image preprocessing and reconstruction according to an embodiment of the present invention may be performed by an adaptive image processing apparatus, and may be alternatively performed by an image processing system including a transmission end and a reception end.

Referring to FIG. 2, the method for adaptive image preprocessing and reconstruction according to an embodiment includes preprocessing an input image at step S110, encoding and decoding the preprocessed image at step S120, and reconstructing the encoded and decoded image at step S130.

Here, when the input image is preprocessed at step S110, a preprocessing kernel generated based on a control parameter, which indicates a weight for human vision and machine vision, may be used.

That is, although not illustrated in FIG. 2, the method according to an embodiment may further include generating a preprocessing kernel based on a control parameter indicting a weight for human vision and machine vision.

Here, reconstructing the encoded and decoded image at step S130 may be performed using a reconstruction network corresponding to the value of the control parameter.

Here, the preprocessing kernel may be a resampling kernel for performing non-uniform sampling on the input image based on the characteristics of the input image.

Here, the preprocessing kernel may perform the function of reducing the size of an image, i.e., cropping the image, selectively resizing the image, and the like, and the scope of the present invention is not limited by the type of the preprocessing kernel.

Here, the reconstruction network may be trained by giving priority to a loss function for performing a machine vision task as the value of the control parameter is larger.

Here, the control parameter may have a value equal to or greater than 0 and equal to or less than 1, and as the value of the control parameter is closer to 0, the loss function may be set to maximally preserve human perceptual quality performance. Also, as the value of the control parameter is closer to 1, the loss function may be set to improve the task execution performance of machines.

Here, reconstructing the encoded and decoded image at step S130 may be performed using multiple models that are respectively trained using the loss function corresponding to the control parameter.

Here, the multiple models may be models that are trained by varying the loss function depending on the control parameter for the reconstruction network.

Here, the preprocessing kernel may be generated adaptively to the input image using a kernel generator network.

Here, the kernel generator network and the reconstruction network may operate in pair depending on the value of the control parameter.

Figure 3:
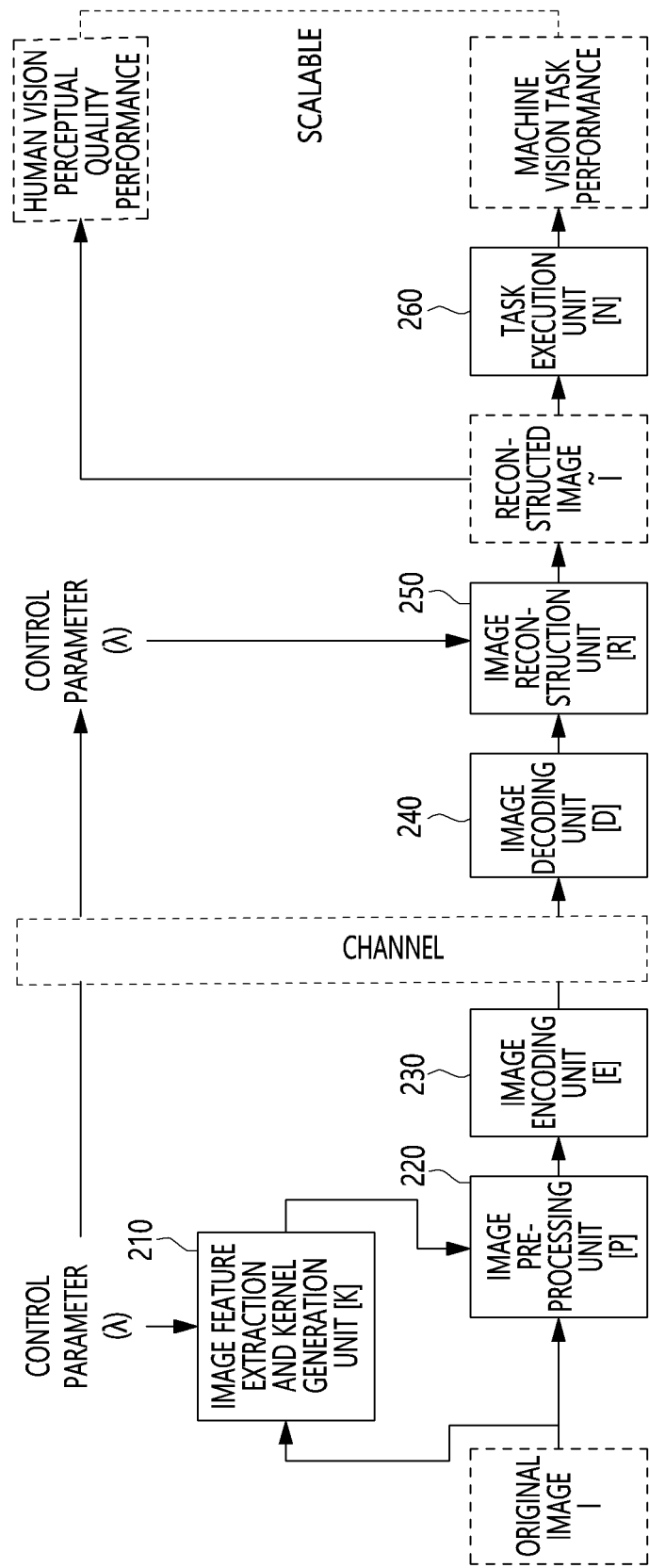
FIG. 3 is a block diagram illustrating an apparatus for adaptive image preprocessing and reconstruction according to an embodiment of the present invention.

FIG. 3 is a block diagram illustrating an apparatus for adaptive image preprocessing and reconstruction according to an embodiment of the present invention.

The adaptive image preprocessing and reconstruction structure according to an embodiment includes the processes of preprocessing, encoding, decoding, and reconstructing an image in order to selectively optimize the performance of a machine vision task or the performance of human perceptual quality for the number of bits transmitted over a channel.

First, an input image I may be preprocessed by an image-preprocessing unit 220 such that the size thereof is reduced. In an embodiment, the image-preprocessing unit 220 may correspond to a resampling module for performing non-uniform sampling on an image using a preset kernel. Alternatively, the image-preprocessing unit 220 may use any module that performs variable preprocessing in order to reduce an image size, i.e., crop or selectively resize an image, based on kernel information.

An image feature extraction and kernel generation unit 210 may generate an image-adaptive kernel to be used for image preprocessing after extracting image features from an input image. In an embodiment, the image feature extraction and kernel generation unit 210 may be a deep-neural network trained to calculate a resampling kernel for non-uniformly sampling an image based on extracted image features. Also, the image feature extraction and kernel generation unit 210 may receive a control parameter $\lambda$, which can be set by a user, and variably generate a kernel based on the control parameter $\lambda$. In an embodiment, the image feature extraction and kernel generation unit 210 may be a module configured to receive $\lambda$ having a value ranging from 0 to 1 and to generate a resampling kernel that is designed to maximally preserve human perceptual quality performance as $\lambda$ is closer to 0 or a resampling kernel that is optimized for the task execution performance of machines as $\lambda$ is closer to 1.

An image encoding unit 230 and an image decoding unit 240 are a pair of modules for compressing a preprocessed image into a bitstream and decoding the bitstream, and standard commercial technology for image encoding/decoding, such as HEVC or VVC, compression technology based on end-to-end deep-learning, and the like may be used therefor. Alternatively, simpler image compression technology may be used or explicit encoding/decoding technology may not be applied, and the method is not limited to a specific method in the present invention. The compressed bitstream may transmitted over a channel, and the control parameter $\lambda$ may be transmitted along with the bitstream such that a transmission end and a reception end share the same.

An image reconstruction unit 250 may perform the function of reconstructing the image to the original size thereof using the preprocessed and encoded/decoded image and the received parameter $\lambda$. In an embodiment, the image reconstruction unit 250 may be a super-resolution deep-neural network, the weight of which varies depending on the control parameter. Such a super-resolution deep-neural network may be multiple models that are trained by varying a loss function depending on the value of $\lambda$, rather than a conventional model trained with a focus only on the human perceptual quality. Also, these multiple models have the same network structure, but may have different weights depending on the purposes thereof by being trained to give priority to a loss function for reconstruction as $\lambda$ is closer to 0 or to give priority to a loss function for a task as $\lambda$ is closer to 1.

The reconstructed image $\hat{I}$ may be directly consumed by humans or may be used for performing a specific machine vision task supported by a system through a task execution unit 260. In an embodiment, the task execution unit may be a pretrained inference network, such as a Faster R-CNN for an object detection task, a Mask R-CNN for an object segmentation task, or the like. In this case, when the reconstructed image is given, PSNR, SSIM, Mean Opinion Score (MOS), and the like may be used for perceptual quality performance for human vision, and mean Average Precision (mAP), and the like may be used for machine vision task performance.

Based on the overall configuration illustrated in FIG. 3, the present invention aims to perform image preprocessing, encoding/decoding, and reconstruction, which enable selective optimization for human perceptual quality performance or machine task execution performance according to need within a single system through an adjustable parameter $\lambda$ and generation of an image-adaptive kernel.

In order to accomplish the above objects, an apparatus for adaptive image preprocessing and reconstruction according to an embodiment of the present invention may include a preprocessing unit 220 for preprocessing an input image, an encoding unit 230 for encoding the preprocessed image, a decoding unit 240 for decoding the encoded image, and a reconstruction unit 250 for reconstructing the decoded image.

Here, the preprocessing unit 220 may use a preprocessing kernel generated based on a control parameter indicating a weight for human vision and machine vision.

Here, the reconstruction unit 250 may perform reconstruction using a reconstruction network corresponding to the value of the control parameter.

Here, the preprocessing kernel may be a resampling kernel for performing non-uniform sampling on the input image based on the characteristics of the input image.

Here, the reconstruction network may be trained by giving priority to a loss function for performing a machine vision task as the value of the control parameter is larger.

Here, the reconstruction unit 250 may perform training using multiple models respectively trained using the loss function corresponding to the control parameter.

Here, the multiple models may be models trained by varying the loss function depending on the control parameter for the reconstruction network.

Here, the preprocessing kernel may be generated adaptively to the input image using a kernel generator network.

Here, the kernel generator network and the reconstruction network may operate in pair depending on the value of the control parameter.

Figure 4:
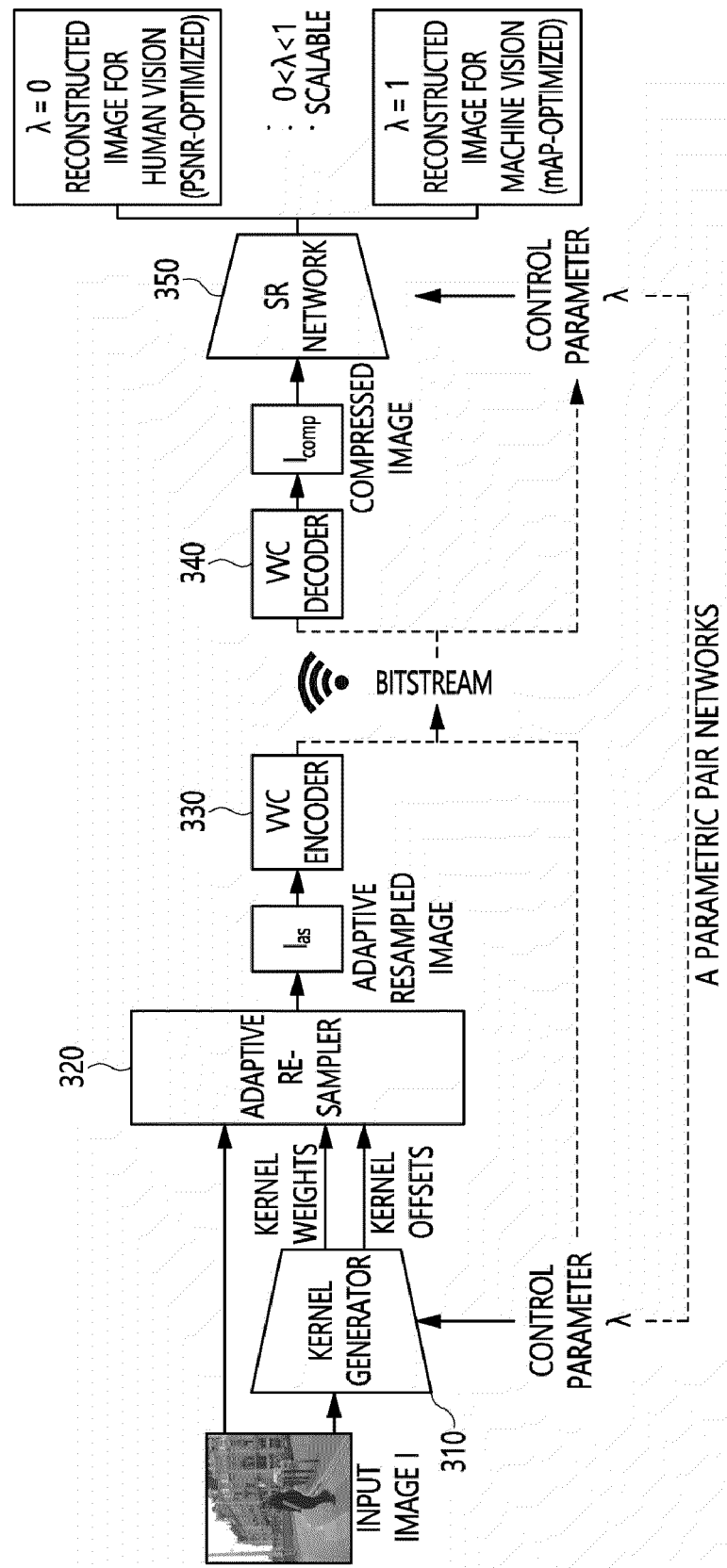
FIG. 4 is a view illustrating a detailed embodiment of the present invention.

FIG. 4 is a view illustrating a detailed embodiment of the present invention.

Referring to FIG. 4, an input image is input to a kernel generator network, and kernel information (kernel weights and offsets) adaptive to the image may be calculated. Here, the weights of the kernel generator network may be changed to enable selective optimization between perceptual quality and task execution performance depending on a control parameter λ. Using the calculated kernel, non-uniform sampling may be performed on the input image through an adaptive re-sampler. The sampled image may be encoded and decoded using standard VVC technology. A compressed bitstream may be transmitted over a channel along with the parameter λ, which is used in the kernel generator. A decoded image may be reconstructed to the original image size through a super-resolution network. Here, the super-resolution network may receive the transmitted control parameter λ and change the weight of the neural network so as to enable selective optimization between perceptual quality and task execution performance. That is, for a certain λ, the kernel generator network and the super-resolution network may operate as a parametric pair. Consequently, a reconstructed image that is scalable and optimized for PSNR performance or mAP performance may be acquired depending on the setting of the value of λ.

Figure 5:
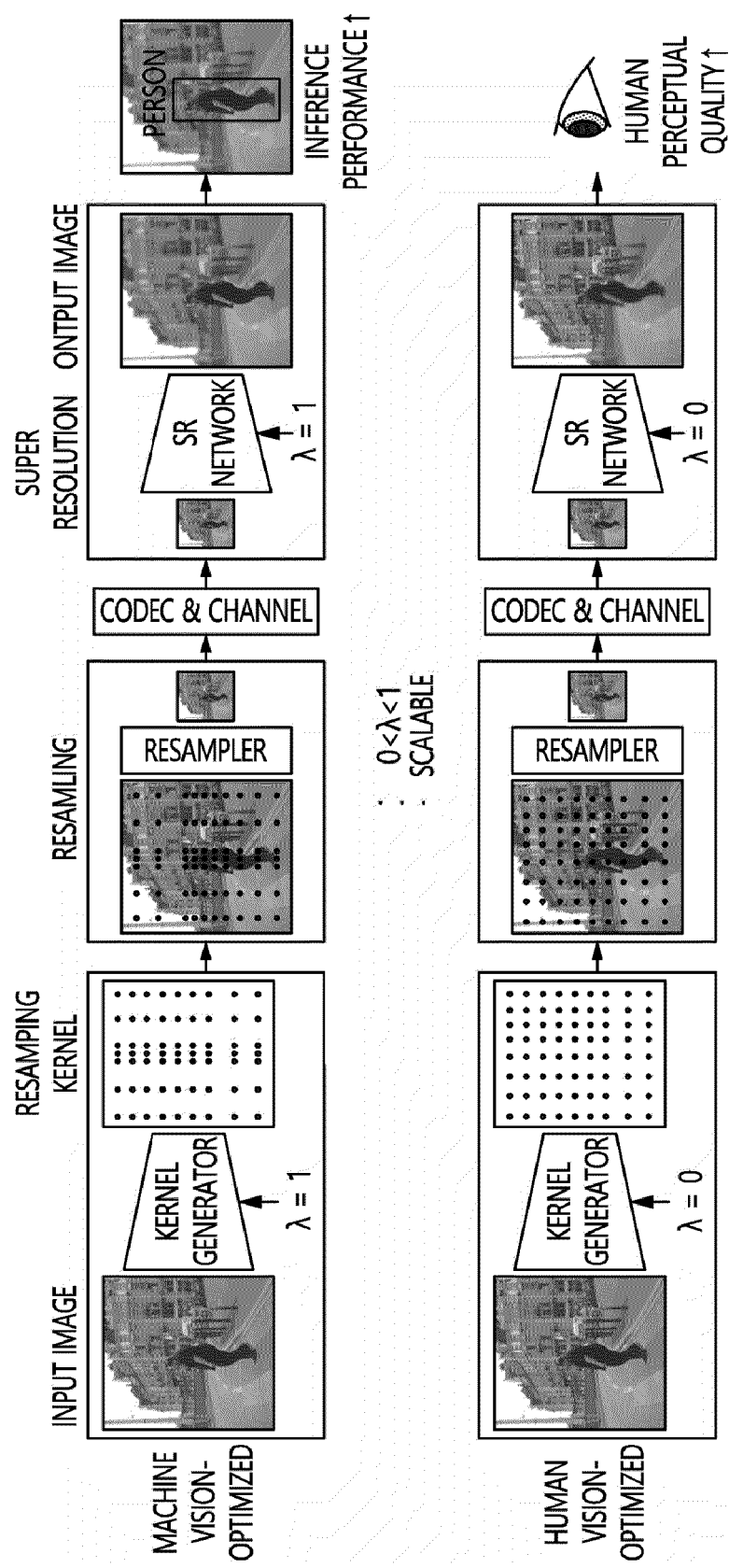
FIG. 5 is a view illustrating an operation process, a generated image, and the effects thereof according to an embodiment of the present invention.

FIG. 5 is a view illustrating an operation process, a generated image, and the effects thereof according to an embodiment of the present invention.

The upper side of FIG. 5 shows an example in which λ=1 is set for a certain input image and an object detection task is performed. A kernel generator may calculate kernel offsets and weights such that center points of a sampling kernel are concentrated in the vicinity of an object. Also, for the image resampled as described above, a super-resolution network may predict a reconstructed image such that the visual information of an object area is relatively well reconstructed. The reconstructed image may be relatively advantageous for performing an object detection task for the number of bits transmitted over a channel.

Meanwhile, the lower side of FIG. 5 shows an example in which λ=0 is set for the same input image. The kernel generator may calculate kernel offsets and weights such that center points of the sampling kernel are concentrated in the edge area in the image or the area including a large number of high-frequency components. Also, the super-resolution network may predict a reconstructed image such that the edge information is well preserved. The image reconstructed as described above may be relatively advantageous from the aspect of visual perception of humans for the number of bits transmitted over a channel.

Figure 6:
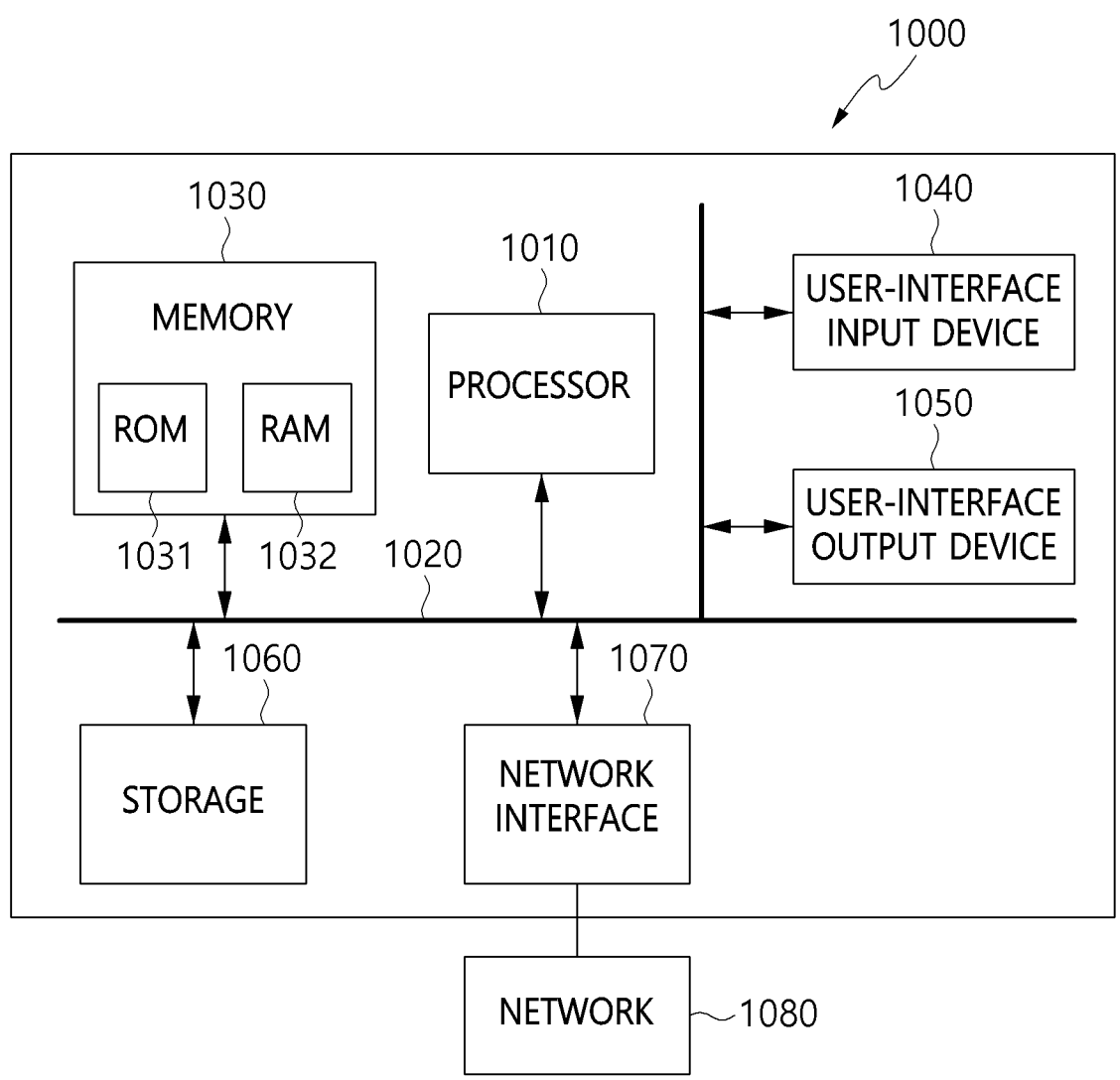
FIG. 6 is a view illustrating the configuration of a computer system according to an embodiment.

FIG. 6 is a view illustrating the configuration of a computer system according to an embodiment.

The apparatus for adaptive image preprocessing and reconstruction according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected to a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a non-volatile medium, a detachable medium, a non-detachable medium, a communication medium, or an information delivery medium, or a combination thereof. For example, the memory 1030 may include ROM 1031 or RAM 1032.

According to the present invention, there may be provided a hybrid vision system for an environment in which images are consumed by both humans and machines.

Also, the present invention may provide a scalable system that can be selectively optimized depending on the task to be performed and requirements.

Also, the present invention may acquire a reconstructed image that is selectively optimized depending on user's purposes in a single system by running image-adaptive preprocessing and reconstruction modules as a parametric pair.

Specific implementations described in the present invention are embodiments and are not intended to limit the scope of the present invention. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present invention should not be construed as being limited to the above-described embodiments, and the entire scope of the appended claims and their equivalents should be understood as defining the scope and spirit of the present invention.

What is claimed is:

1. A method for adaptive image preprocessing and reconstruction, comprising:
preprocessing an input image;
encoding and decoding the preprocessed image; and
reconstructing the encoded and decoded image, wherein
preprocessing the input image comprises using a preprocessing kernel generated based on a control parameter indicating a weight for human vision and machine vision,
reconstructing the encoded and decoded image is performed using a reconstruction network corresponding to a value of the control parameter,
reconstructing the encoded and decoded image is performed using multiple models respectively trained using a loss function corresponding to the control parameter, and
the reconstruction network is trained by giving priority to a loss function for performing a task of the machine vision as the value of the control parameter is larger.

2. The method of claim 1, wherein the preprocessing kernel is a resampling kernel for performing non-uniform sampling on the input image based on characteristics of the input image.

3. The method of claim 1, wherein the multiple models correspond to models trained by varying the loss function depending on the control parameter for the reconstruction network.

4. The method of claim 1, wherein the preprocessing kernel is generated adaptively to the input image using a kernel generator network.

5. The method of claim 4, wherein the kernel generator network and the reconstruction network operate in pair depending on the value of the control parameter.

6. An apparatus for adaptive image preprocessing and reconstruction, comprising:
at least one processor; and at least one memory communicatively coupled to the at least one processor, the at least one memory comprising one or more sequences of one or more instructions that, when executed by the at least one processor, cause the apparatus at least to:
  preprocess an input image using a preprocessing kernel generated based on a control parameter indicating a weight for human vision and machine vision;
  encode the preprocessed image;
  decode the encoded image; and
  reconstruct the decoded image, wherein
reconstruction of the decoded image comprises use of a reconstruction network corresponding to a value of the control parameter,
reconstruction of the decoded image comprises use of multiple models respectively trained using a loss function corresponding to the control parameter, and
the reconstruction network is trained by giving priority to a loss function for performing a task of the machine vision as the value of the control parameter is larger.

7. The apparatus of claim 6, wherein the preprocessing kernel corresponds to a resampling kernel for performing non-uniform sampling on the input image based on characteristics of the input image.

8. The apparatus of claim 6, wherein the multiple models correspond to models trained by varying the loss function depending on the control parameter for the reconstruction network.

9. The apparatus of claim 6, wherein the one or more sequences of the one or more instructions are further configured to cause, when executed by the at least one processor, the apparatus at least to generate the preprocessing kernel adaptively to the input image through use of a kernel generator network.

10. The apparatus of claim 9, wherein the kernel generator network and the reconstruction network operate in pair depending on the value of the control parameter.

* * * * *